United States Patent [19]
Yokota et al.

[11] Patent Number: 5,386,409
[45] Date of Patent: Jan. 31, 1995

[54] OPTICAL INFORMATION REPRODUCING APPARATUS HAVING IMPROVED LASER OSCILLATION

[75] Inventors: Tsuneshi Yokota, Kawasaki; Katsumi Suzuki, Tokyo, both of Japan

[73] Assignee: Kabushiki Kaisha Toshiba, Kawasaki, Japan

[21] Appl. No.: 102,252

[22] Filed: Aug. 5, 1993

[30] Foreign Application Priority Data

Aug. 5, 1992 [JP] Japan .................. 4-208852

[51] Int. Cl.[6] .............................. G11B 7/125
[52] U.S. Cl. ............................ 369/116; 369/60
[58] Field of Search ............ 369/53, 54, 60, 61, 369/62, 64, 59, 115, 116, 99, 122, 124

[56] References Cited

U.S. PATENT DOCUMENTS

4,480,325 10/1984 Aiki et al. .................. 369/122
4,787,078 11/1988 Yokogawa .................. 369/116
5,107,473 4/1992 Fuji et al. .................... 369/124

Primary Examiner—Paul M. Dzierzynski
Assistant Examiner—Don Wong
Attorney, Agent, or Firm—Cushman, Darby & Cushman

[57] ABSTRACT

A laser driver outputs a drive current. A high frequency current generated by a HF current generator is superimposed to the drive current via a coupling capacitor. A laser diode is driven by the high-frequency-current superimposed drive current. This superimposed drive current has a period for performing a laser oscillation at the laser diode and a period for stopping the laser oscillation. The laser light is reflected at the surface of an optical disk and returned to the laser diode. When the reflected laser light is returned to the laser diode, the laser diode is in the laser oscillation stopping period of the superimposed drive current.

12 Claims, 8 Drawing Sheets

FIG. 4A DRIVE CURRENT

FIG. 4B HF CURRENT If

FIG. 4C LASER OUTPUT

OPTICAL INFORMATION REPRODUCING APPARATUS HAVING IMPROVED LASER OSCILLATION

BACKGROUND OF THE INVENTION

1. Field of the Invention

The present invention relates to an optical information recording/reproducing apparatus for optically recording or reproducing information and, more particularly, to an optical information recording/reproducing apparatus using a semiconductor laser oscillator as a light source.

2. Description of the Related Art

Various types of optical information recording/reproducing apparatuses are developed. In such an optical information recording/reproducing apparatus, a laser light is conventionally obtained from a semiconductor laser oscillator arranged in an optical head, and information is recorded to an information recording medium (optical disk) using the laser light, or the recorded information is read out (reproduced or played back) from the optical disk.

Normally, an optical information recording/reproducing apparatus is provided with an optical pickup using a semiconductor laser oscillator. In such an optical pickup, a few % of the laser light reflected at the surface of an optical disk is fed back to the semiconductor laser oscillator. This fed-back reflection increases the noise level of the laser oscillator.

For an apparatus designed to accurately recording/reproducing information to/from the optical disk, the above-mentioned increased noise of the laser oscillator is an important problem to be solved. For instance, increased noise of the laser oscillator degrades the tone quality of a PCM (Pulse Code Modulation) audio player or a CD (Compact Disk) player and also degrades the image quality of a laser video disk player.

The main factor of the noise of a semiconductor laser oscillator resides in a fact that part of laser light reflected at the mirror surface of an optical disk is returned to the semiconductor laser oscillator, which factor causes a return-light-induction noise. More specifically, the return light is mixed into the light in the laser resonator so as to cause a coupling resonance effect, thereby making the laser oscillation mode unstable.

There is a countermeasure to the above unstable laser oscillation. That is, a high frequency signal superimposed to a laser driving signal so that the laser oscillator oscillates in a multi-longitudinal mode oscillation, thereby lessening the influence of the return light.

For instance, according to a prior art method disclosed in Japanese Patent Disclosure (kokai) No. 59-9086 or U.S. Pat. No. 4,480,325 (Aiki et al. ), a high frequency oscillation output current is superimposed to a drive current of the semiconductor laser oscillator in order to obtain a laser light output in the multi-longitudinal mode, thereby suppressing the noise in the laser light output.

In the above prior art method, a sine oscillation waveform is normally adapted to the superimposed high frequency current. The optimum values of the intensity and the frequency of this high frequency current depend on the type of the semiconductor laser oscillator. Further, even if the optimum intensity and optimum frequency are adapted, a highly stable and low noise laser oscillation cannot be satisfactorily obtained.

Thus, according to the above-mentioned prior art semiconductor laser oscillator using a multi-longitudinal mode oscillation, it is difficult to achieve a highly stable and low noise laser oscillation.

SUMMARY OF THE INVENTION

It is accordingly an object of the present invention to provide an optical information reproducing apparatus in which a highly stable and low noise laser oscillation can be performed.

In order to achieve the above object, the optical information reproducing apparatus of the invention comprises a drive current generator for generating a drive current; a high frequency current generator for generating a high frequency current having a pulse waveform whose duty ratio is set at other than 50%; a circuit superimposing the high frequency current generated by the high frequency current generator to the drive current generated by the drive current generator so as to provide a superimposed drive current; a laser oscillator for generating a laser light, used for reproducing information from an information recording medium, based on the superimposed drive current provided by the superimposing circuit; an optical system for leading the laser light generated by the laser oscillator to the information recording medium; a device for monitoring the laser light generated by the laser oscillator to provide a monitor signal; a controller for controlling the drive current generated by the drive current generator so as to set the laser light generated by the laser oscillator to a predetermined intensity.

In the above apparatus, the high frequency current from the high frequency current generator is superimposed to the drive current for driving the laser oscillator. According to the superimposed drive current, the laser oscillator generates the laser for an oscillation period but not generates for a non-oscillation period. The influence of a return light from the information recording medium can be eliminated by setting the non-oscillation period such that at the time when the laser light generated during the oscillation period is reflected at the information recording medium and then returned to the laser oscillator, the laser oscillator stops in the non-oscillation period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

In the following, a preferred embodiment of the present invention will be described.

Figure 1:
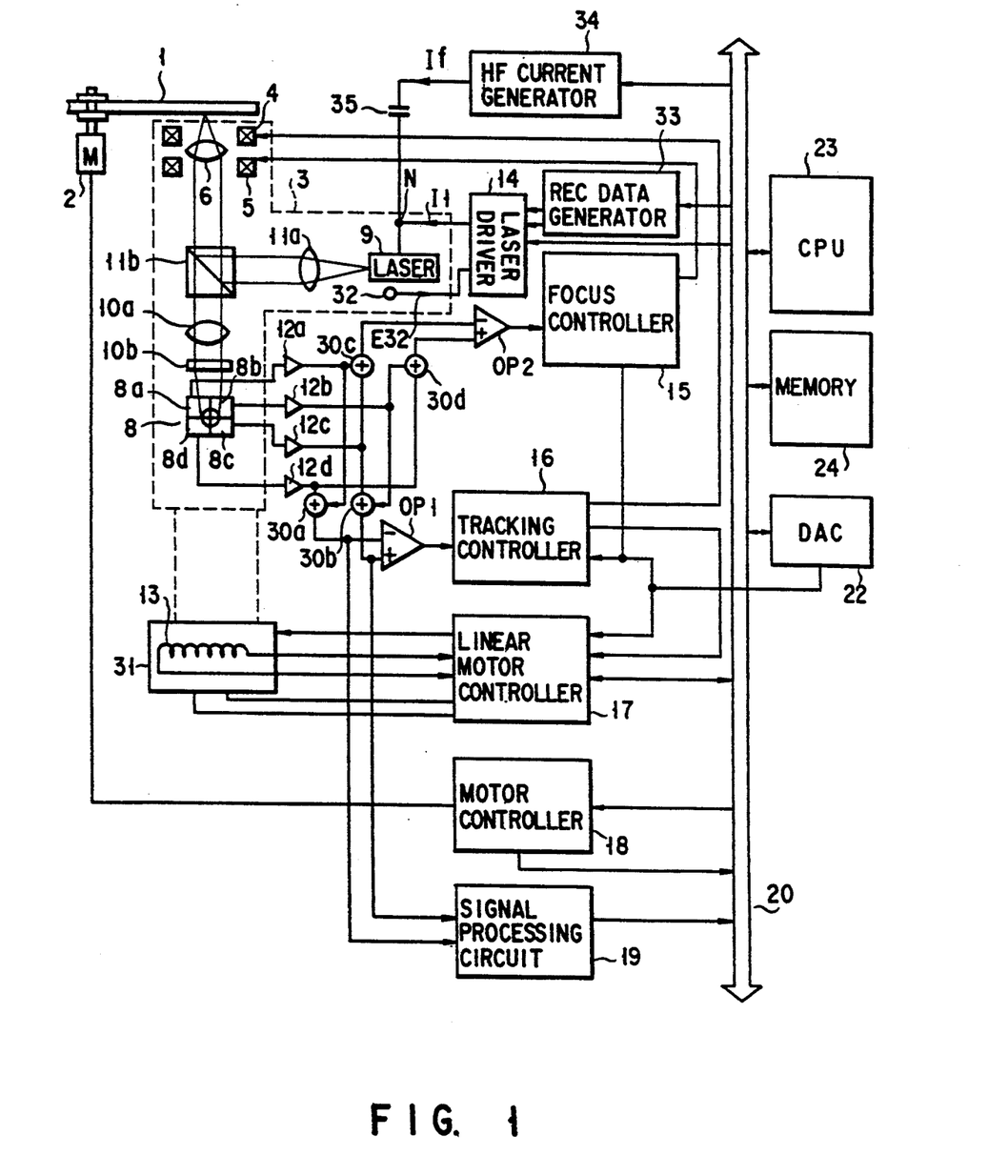
FIG. 1 is a block diagram showing the schematic configuration of an optical disk apparatus according to an embodiment of the present invention.

FIG. 1 is a block diagram showing the configuration of an optical disk apparatus adapting an optical information recording/reproducing system.

More specifically, the surface of optical disk (information recording medium) 1 is provided with spiral or coaxial grooves (recording tracks), and optical disk 1 is driven by motor 2 to rotate with, for example, a constant speed. Motor 2 is controlled by motor controller 18.

Recording or reproducing (playing back) to or from optical disk 1 is performed via optical head 3. Optical head 3 is fixed to drive coil 13 by which the movable portion of linear motor 31 is constituted. Drive coil 13 is connected to linear motor controller 17.

Although not shown, a permanent magnet is arranged at the fixing portion of linear motor 31. When linear motor controller 17 energizes drive coil 13, optical head 3 is moved at substantially a constant speed along with the radial direction of optical disk 1.

In optical head 3, objective lens 6 is supported by a wire or a sheet spring (not shown). Objective lens 6 can be moved by drive coil 5 along with the direction of focusing (or the direction of the optical axis of the lens), and it can also be moved by drive coil 4 along with the direction of tracking (or the direction perpendicular to the optical axis of the lens).

A laser light is generated from laser diode (semiconductor laser oscillator) 9 which is driven by laser controller 14. The laser light is led to the surface of optical disk 1, via collimator lens 11a, half prism 11b, and objective lens 6. The light reflected at the surface of optical disk 1 is then led to optical detector 8, via objective lens 6, half prism 11b, convergent lens 10a, and cylindrical lens 10b.

Incidentally, optical detector 8 is formed of four divided light detector cells 8a, 8b, 8c, and 8d.

An output signal from light detector cell 8a of optical detector 8 is supplied to one terminal of each of adders 30a and 30c, via amplifier 12a. An output signal from light detector cell 8b of optical detector 8 is supplied to one terminal of each of adders 30b and 30d, via amplifier 12b. An output signal from light detector cell 8c of optical detector 8 is supplied to the other terminal of each of adders 30b and 30c, via amplifier 12c. An output signal from light detector cell 8d of optical detector 8 is supplied to the other terminal of each of adders 30a and 30d, via amplifier 12d.

An output signal from adder 30a is supplied to the inverting input terminal of differential amplifier OP1. An output signal from adder 30b is supplied to the non-inverting input terminal of differential amplifier OP1. Then, differential amplifier OP1 supplies tracking controller 16 with a tracking differential signal which represents the difference between the outputs of adders 30a and 30b. Tracking controller 16 generates a tracking drive signal in accordance with the tracking differential signal supplied by differential amplifier OP1.

The tracking drive signal generated by tracking controller 16 is supplied to drive coil 4 of the tracking direction. The tracking differential signal supplied to tracking controller 16 is supplied to linear motor controller 17.

Linear motor controller 17 supplies drive coil (electric wires) 13 of linear motor 31 with a voltage corresponding to the speed of movement of the linear motor, based on the tracking differential signal from tracking controller 16 and a movement control signal from CPU 23.

Linear motor controller 17 includes a speed detector (not shown) for detecting the speed of movement of linear motor 31, or detecting the relative speed between drive coil 13 and a magnetic member (not shown) which generates magnetic fluxes. The speed detector detects the relative speed based on a change in the electrical state of drive coil 13. This change will occur just at the time when drive coil 13 intersects the magnetic flux generated by the magnetic member.

An output signal from adder 30c is supplied to the inverting input terminal of differential amplifier OP2. An output signal from adder 30d is supplied to the non-inverting input terminal of differential amplifier OP2. Then, differential amplifier OP2 supplies focus controller 15 with a focusing point signal according to the difference between the outputs of adders 30c and 30d. An output signal of focus controller 15 is supplied to focusing drive coil 5, so that the laser light is controlled always to be just-focused at the surface of optical disk 1.

After effecting the focusing and tracking control, sum signals of the outputs from respective light detector cells 8a–8d of optical detector 8, or the outputs from adders 30a and 30b, contains information of variations in the rate of reflection at the pits (recorded information) formed on the track of optical disk 1. These sum signals are supplied to signal processing circuit 19. In signal processing circuit 19, the recorded information and the address information (track numbers, sector numbers, etc.) are reproduced.

The laser light output of laser diode 9 is monitored by photodiode 32. The monitored laser light is converted into electrical signal E32. Signal E32 is fed back to laser controller 14, thereby stabilizing the laser light output of laser diode 9.

Laser controller 14 receives laser output level set signal E331 and record data signal E332 from record data generator 33. Signal E331 from record data generator 33 has a specific voltage potential by which the magnitude of recording drive current I1(REC) is determined.

To the drive current (I1(REC) for recording; I1(PB) for playing back or reproducing), high frequency current If is superimposed at node N. This high frequency current is obtained through capacitor 35 from high frequency current generator 34.

The optical disk apparatus of FIG. 1 includes digital-to-analog converter (DAC) 22 through which information is exchanged between CPU 23 and focus controller 15, tracking controller 16, or linear motor controller 17.

Tracking controller 16 controls objective lens 6 so as to shift the laser beam by one track in response to track jump signal which is supplied from CPU 23 via DAC 22.

In the configuration of FIG. 1, laser controller 14, focus controller 15, tracking controller 16, linear motor controller 17, motor controller 18, signal processing circuit 19, record data generator 33, high frequency current generator 34, and memory 24 are coupled to, and controlled by, CPU 23, via bus 20. CPU 23 executes the program stored in memory 24 to achieve various operations.

Figure 2:
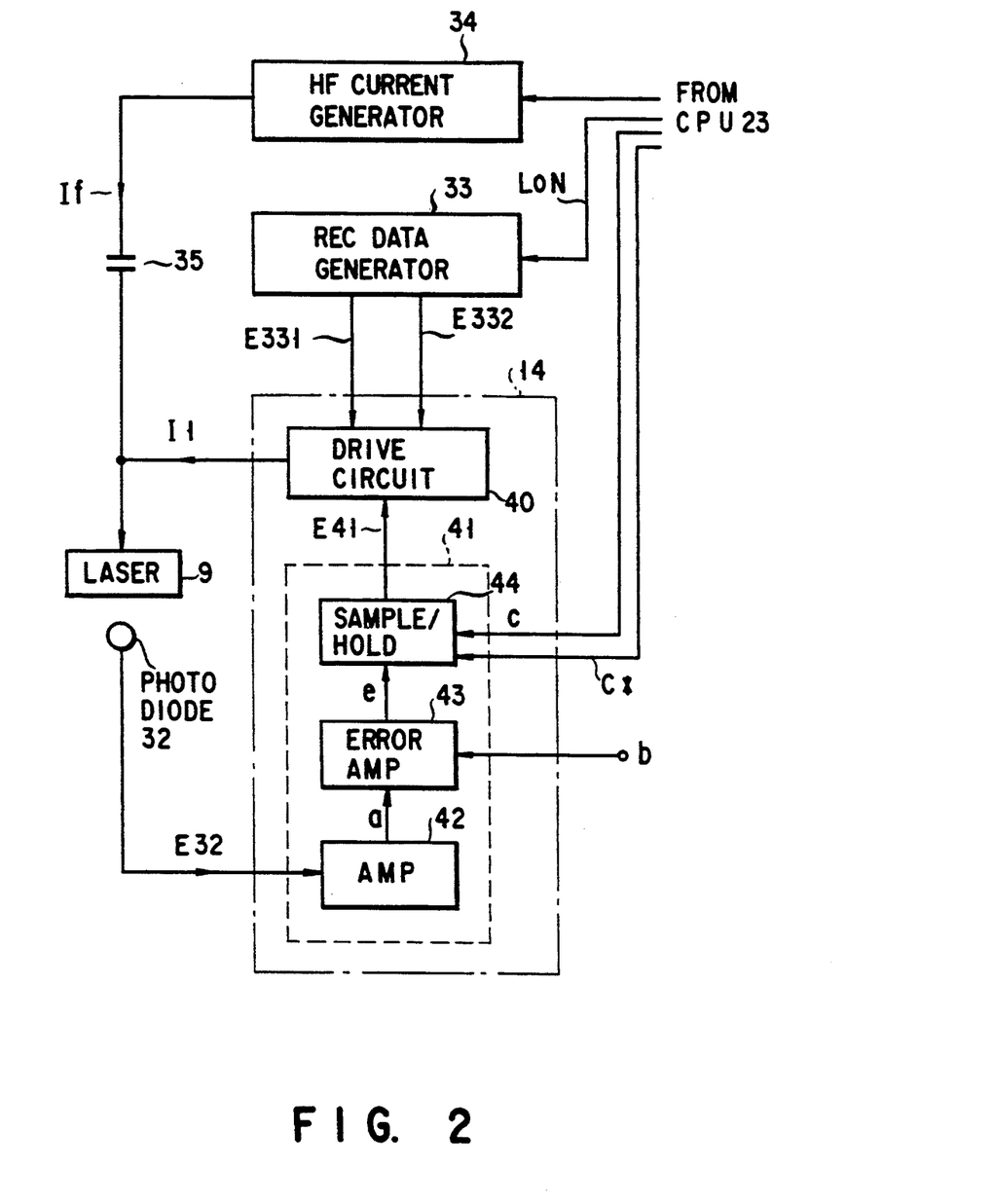
FIG. 2 is a block diagram showing the internal configuration of the laser driver in FIG. 1.

FIG. 2 is a block diagram showing the internal configuration of laser driver 14. As is shown in the figure, laser driver 14 is formed of drive circuit 40 which generates drive current I1 for driving laser diode 9, and compensation circuit 41 which compensates for the drive current from drive circuit 40 by signal E32 output from photodiode 32. Photodiode 32 monitors the laser light output from laser diode 9.

Compensation circuit 41 includes amplifier 42 for amplifying output signal E32 from photodiode 32, error amplifier 43 for amplifying the difference (b−a) between output signal a from amplifier 42 and a predetermined reference signal b, and sample/hold circuit 44 for temporarily storing/holding output signal e from error amplifier 43.

Note that the above predetermined reference signal b has a preset voltage by which the output level of laser diode 9 during data playback (reproduction) is set to a prescribed value (for example, output level of 1 mW).

The sampling/holding state of sample/hold circuit 44 is controlled by the logical level of control signal c from CPU 23. More specifically, during the data playback (or information reproduction), the logical level of control signal c becomes "1" level so that sample/hold circuit 44 is in the sampling state (pass-through state). In this state, output signal e from error amplifier 43 becomes output signal E41 sent to drive circuit 40.

During the data recording, the logical level of control signal c becomes "0" level so that sample/hold circuit 44 is in the holding state (blocking state). In this state, output signal e from error amplifier 43, obtained just before the level change of signal c from "1" to "0", is held at sample/hold circuit 44 and the held level of signal e becomes output signal E41 sent to drive circuit 40.

Figure 3:
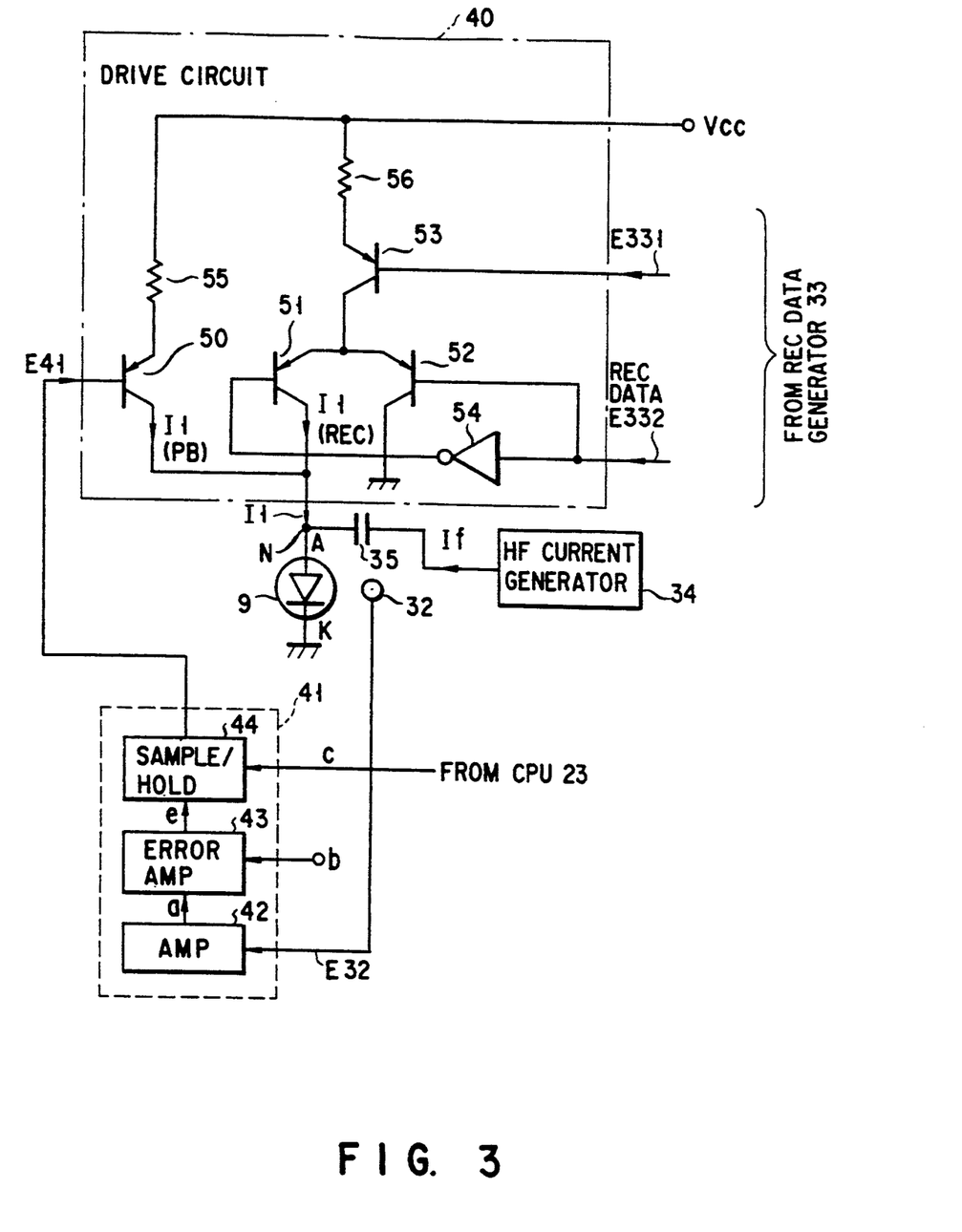
FIG. 3 is an example of the circuit configuration of the drive circuit in FIG. 2.

FIG. 3 is an example of the circuit configuration of drive circuit 40. Drive circuit 40 is formed of PNP transistors 50–53, inverter 54, and resistors 55–56.

As is shown in FIG. 3, laser diode 9 is used in a cathode common state. More specifically, the cathode of laser diode 9 is circuit grounded and the anode of diode 9 is connected to the collector of each of transistors 50 and 51. The emitter of transistor 50 is connected through resistor 55 to a power supply circuit of voltage Vcc. The base of transistor receives signal E41 from sample/hold circuit 44 in compensation circuit 41.

The emitter of transistor 51 is connected to the emitter of transistor 52 whose collector is circuit-grounded. The emitters of transistors 51 and 52 are connected to the collector of transistor 53, and the emitter of transistor 53 is connected through resistor 56 to the power supply circuit of voltage Vcc.

The base of transistor 53 receives laser output level set signal E331 from record data generator 33. The base of transistor 52 receives record data signal E332 from record data generator 33. The logical level of signal E332 is inverted via inverter 54, and the inverted level of signal E332 is supplied to the base of transistor 51.

The magnitude of the collector current of transistor 53 depends on the voltage potential of signal E331. When signal E332="0", transistor 52 is turned on while transistor 51 is turned off. In this case, the collector current of transistor 51 becomes zero. When signal E332="1", transistor 52 is turned off while transistor 51 is turned on. In this case, the collector current of transistor 51 becomes equal to the collector current of transistor 53 whose magnitude is determined by laser output level set signal E331.

When data recorded in optical disk 1 is to be reproduced or played back, CPU 23 sends instruction (signals c and c*) to sample/hold circuit 44, so that signal E41 representing output e of error amplifier 43 is supplied to the base of transistor 50. Then, transistor 50 outputs collector current I1(PB) whose magnitude corresponds to the voltage potential of signal E41.

Based on the instruction from CPU 23, high frequency current If is supplied via capacitor 35 from high frequency current generator 34, and high frequency current If is superimposed at node N to collector current I1(PB) from transistor 50. The high-frequency-current-superimposed current is then supplied to the anode of laser diode 9.

Note that during the data playback state, transistor 51 is cut-off by the high level of the output from inverter 54 (or by the low level of signal E332), so that no recording current is supplied to laser diode 9.

Laser diode 9 is energized to oscillate with the laser output level of data playback (reproduction), based on the playback drive current (I1(PB)+If) containing the superimposed high frequency current (If).

The laser light output from laser diode 9 is monitored by photodiode 32 and is detected as monitor signal E32. Detected monitor signal E32 is fed back to compensation circuit 41 in order to stabilize the laser oscillation output.

Output signal E32 from photodiode 32 is amplified by amplifier 42 in compensation circuit 41, and amplified signal a is sent to error amplifier 43. Error amplifier 43 detects the difference between signal a from amplifier 42 and predetermined reference signal b (representing the laser output of 1 mW), and amplifies the difference (signal e) so as to supply the amplified difference to sample/hold circuit 44.

As has been mentioned, in the playback or reproduction mode, sample/hold circuit 44 is set to the sample state (pass-through state) by the logical level "1" of control signal c from CPU 23. In this case, output e from error amplifier 43 is sent to the base of transistor 50 (E41≈e). Thus, a closed loop (comprising elements 32-42-43-44-50-9-32) is formed, and transistor 50 supplies drive current I1(PB) so that the output level of laser diode 9 is maintained at a prescribed value (e.g., 1 mW).

When data is to be recorded to optical disk 1, record data generator 33 receives recording laser on signal LON from CPU 23.

When signal LON is received, record data generator 33 generates record data signal E332. When transistor 52 is turned off by the high level of signal E332, transistor 51 is turned on by the low level of the output from inverter 54. Then, current I1(REC), whose magnitude corresponds to the signal level of laser output level set signal E331, flows through resistor 56 and transistors 53 and 51.

The sum of current I1(PB) from transistor 50 and current I1(REC) from transistor 51 becomes drive current I1 for data recording, having an output level of, for example, 20 mW.

Note that the magnitude (amplitude) of current I1(-REC) can be optionally determined by the voltage potential of signal E331 applied to the base of transistor 53. (Decreasing the potential of signal E331 results in increasing the magnitude of current I1(REC).)

Superimposed to drive current I1 (=I1(REC)+I1(PB)) is high frequency current If obtained through capacitor 35 from high frequency current generator 34. Thus, the sum of drive current I1 and high frequency current If flows into laser diode 9.

Laser diode 9 oscillates with a specific output level (e.g., 20 mw) of the recording laser light according to drive current I1 to which high frequency current If is superimposed. At this time, since photodiode 32 receives the recording level laser light (20 mW), the signal level of output a from amplifier 42 becomes high. The signal level of output a obtained for the recording level laser light (e.g., 20 mW) is several times higher than that obtained for the playback (reproducing) level laser light (e.g., 1 mW).

When the level of output a from amplifier 42 is high, the level of control signal c from CPU 23 is low ("0") level so that sample/hold circuit 44 is in the hold state. In this case, sample/hold circuit 44 stores the recent preceding input level (output e from error amplifier 43 during the data playback), and the stored level is sent as signal E41 to the base of transistor 50. Thus, the influence of large monitor signal E32 due to the recording level laser light from laser diode 9 is removed by cutting off the large output from error amplifier 43 during recording.

Now, the description will be given to a case wherein laser diode 9 oscillates to generate a laser light for reproducing the recorded information from optical disk 1.

Assume that optical head 3 is moved to a given position on optical disk 1 and laser diode 9 oscillates to generate the laser light for reproduction (playback) of the recorded information.

The generated laser light is led to the surface of optical disk 1, via collimator lens 11a, half prism 11b, and objective lens 6. At this time, optical disk 1 rotates with a given speed. When the reproduction level laser light scans the recording tracks on optical disk 1, the scanned tracks are detected so as to perform tracking control.

The above tracking control can be achieved by various manners of a prior art. Therefore, explanation to the details of the tracking control will be omitted.

Figure 4A:
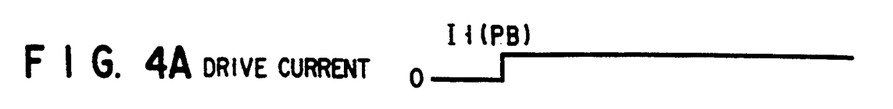
FIGS. 4A–4C show waveforms for explaining the relation among the drive current, high frequency current, and laser output.
Figure 4B:
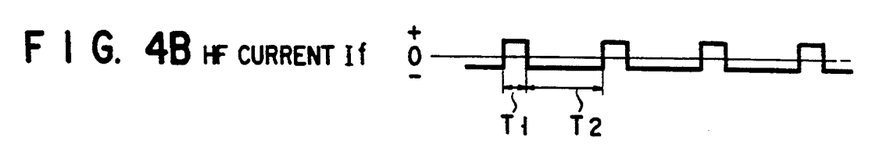
Figure 4C:
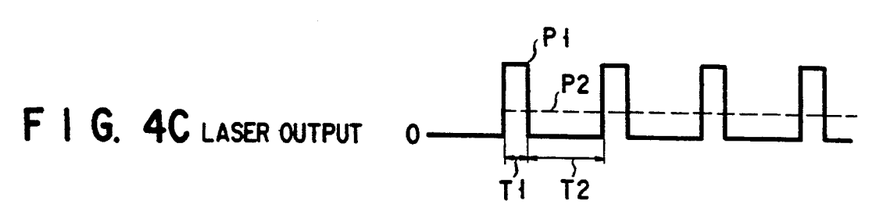

According to the above-mentioned embodiment of the present invention, during the reproduction (playback), transistor 50 of drive circuit 40 supplies drive current I1 (I1(PB)) as shown in FIG. 4A. High frequency current If as shown in FIG. 4B is supplied via capacitor 35 and superimposed at node N to drive current I1. The superimposed current (I1+If) is supplied to laser diode 9. Then, laser diode 9 oscillates to provide the laser output (playback laser light) as shown in FIG. 4C.

More specifically, since high frequency current If having periods T1 and T2 is superimposed to drive current I1, the magnitude of the current for driving laser diode 9 increases during period T1.

Meanwhile, the magnitude of the current for driving laser diode 9 decreases during period T2, during which laser diode 9 cannot be oscillated because of the decreased drive current. Then, laser oscillating period T1 and laser stopping period T2 are obtained. During laser oscillating period T1, the laser output level becomes peak level P1 and, during laser stopping period T2, the laser output level becomes average level P2.

Level P2 is obtained by averaging the total laser output for the period (T1+T2) of high frequency current If, and is used for reproducing (playing back) the information recorded on optical disk 1.

Figure 9:
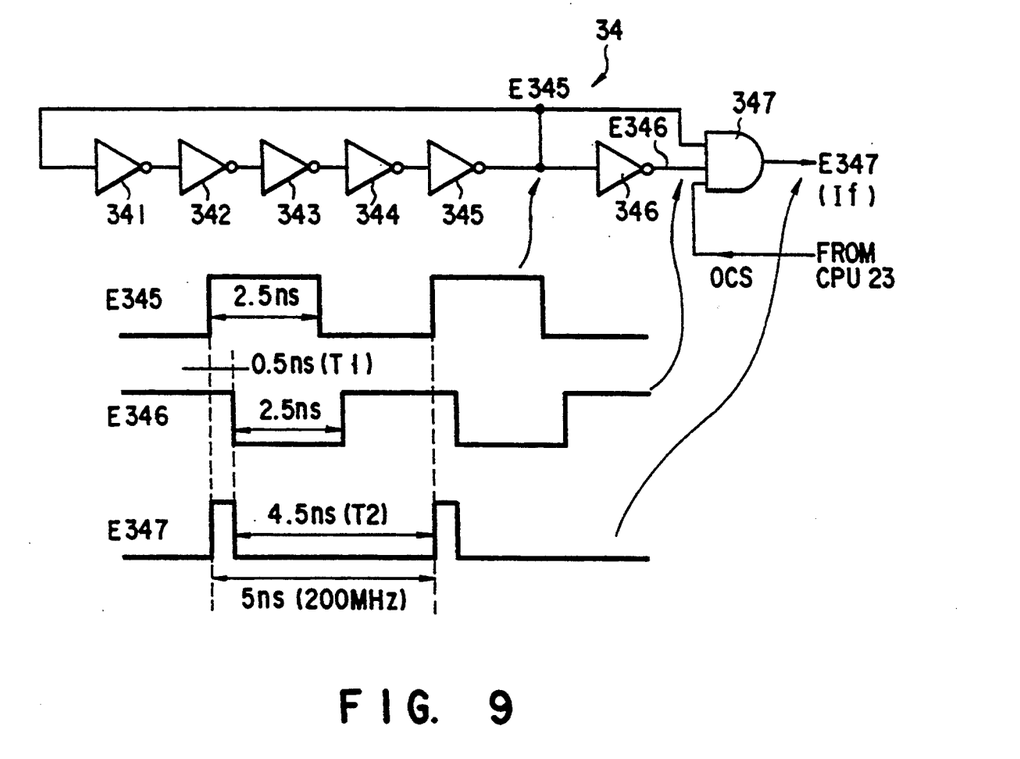
FIG. 9 is an example of the circuit configuration of the high frequency current generator in FIG. 1.

High frequency current generator 34 is formed of a pulse generator which may be an stable multivibrator (cf. FIG. 9).

Figure 5:
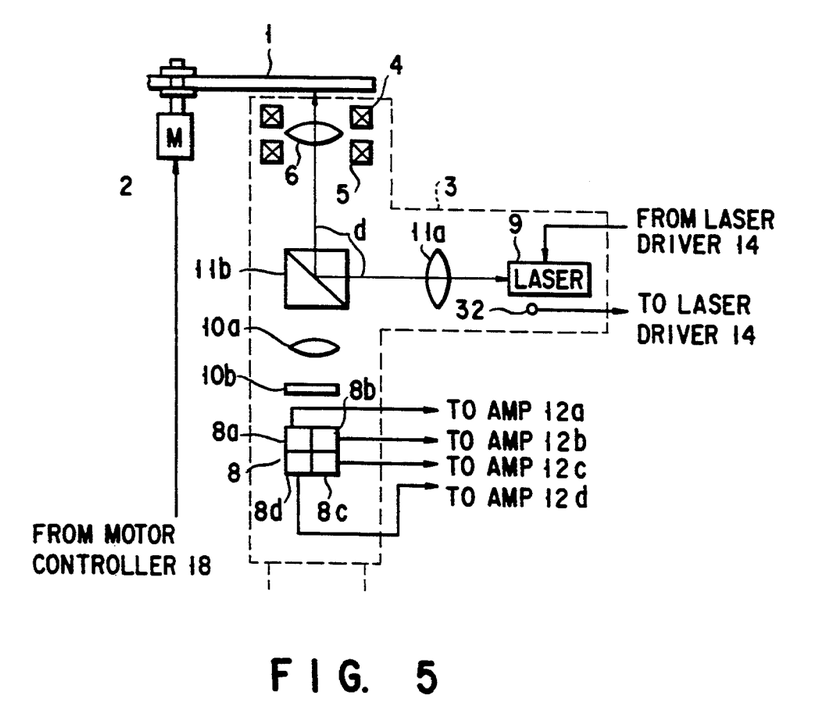
FIG. 5 is a schematic diagram for explaining the laser beam path (d) between the surface of the optical disk and the laser diode.

See FIG. 5. The distance between the laser output surface of laser diode 9 and the information recording surface of optical disk 1 is denoted as d, and the speed of laser light is denoted as c.

Time $T2d$ required to travel the laser light for distance $2d$ can be obtained by:

$$T2d = 2d/c \quad (1)$$

Assume that Ton denotes the laser oscillation period T1 and Toff denotes the laser non-oscillation (stopping) period T2. Under this assumption, the following relation is given:

$$Ton < 2d/c < Toff \quad (2)$$

If the relation (2) is satisfied, and when the laser light generated by laser diode 9 and reflected at the surface of optical disk 1 returns to laser diode 9, the operation state of laser diode 9 is in the laser stopping period of Toff (or T2). In this case, since the laser oscillation is stopped, the laser oscillation is not rendered unstable by the returned laser light and no noise is caused by the returned laser light.

Thus, the laser oscillation of the laser diode 9 at the time of reproduction (playback) is stably performed with the average level of P2, and the obtained laser light is free of noise due to the returned laser light.

The relation of Ton<Toff (or T1<T2) implies that the difference between Ton and Toff (or T1 and T2) should, preferably, be as large as possible, because the advantage obtained by this relation will be enhanced as the difference becomes large. In other words, when the difference between Ton and Toff (or T1 and T2) is large, the degree of freedom with respect to optical path length d from laser diode 9 to optical disk 1 is increased.

Incidentally, the frequency of high frequency current If should be far higher (e.g., 200 MHz) than that of the information (several MHz at most) to be reproduced from optical disk 1.

Now, the description will be given to a case wherein laser diode 9 oscillates to generate a laser light for recording information to optical disk 1.

Figure 6A:
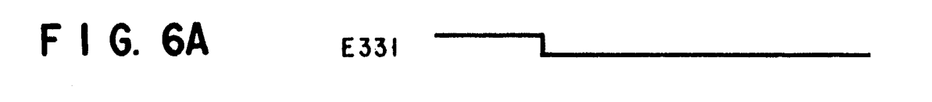
FIGS. 6A–6D show waveforms for explaining the relation among the recording level, recording data, drive current (for playing back), and drive current (for recording)
Figure 6B:
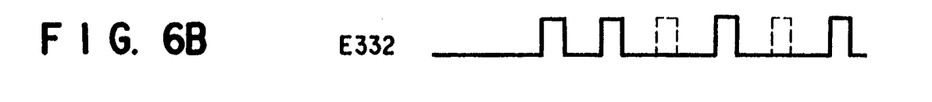

During when laser diode 9 oscillates with average laser output level P2 for reproduction (playback), CPU 23 instructs record data generator 33 to perform information recording on optical disk 1. Upon receiving the instruction from CPU 23, record data generator 33 generates signal E331 (FIG. 6A) for setting the magnitude of drive current I1(REC) and record data signal E332 (FIG. 6B). Signals E331 and E332 are supplied to drive circuit 40.

Figure 6C:
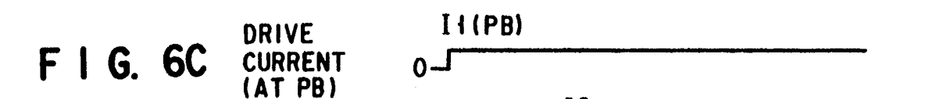
Figure 6D:
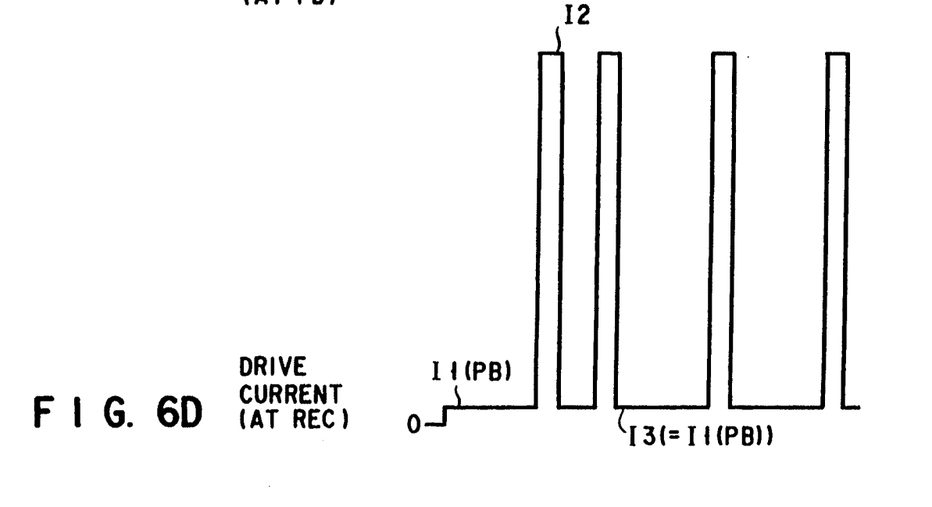

In drive circuit 40, current I1(PB) (FIG. 6C) from transistor 50 is added to current I1(REC) from transistor 51, thereby obtaining the drive current as shown in FIG. 6D. Current I1(PB) drives laser diode 9 so as to oscillate with average laser output level P2 for reproduction. Current I1(REC) is output in accordance with the high ("1") level of signal E332.

In the illustration of FIG. 6D, when E331=high ($\approx$Vcc), I1=I1(PB); when E331=low ($\approx$0) and E332="1", I1=I2 (=I1(PB)+I1(REC)); and when E331=low and E332="0", I1=I3 (=I1(PB)).

High frequency current If (FIG. 4B) from high frequency current generator 34 is supplied via coupling capacitor 35 and superimposed to drive current I1 which is then supplied to laser diode 9. Laser diode 9 performs laser oscillation based on the supplied drive current (I1+If) to which the high frequency current superimposed.

In FIG. 6D, the laser output for recording (20 mW) is obtained by current I2 (=I1(PB)+I1(REC)). Since the power level of the recording laser output is sufficiently high, the aforementioned influence of the returned laser light is negligible.

Incidentally, since the magnitude of drive current I2 is so large, the laser oscillation continues even during period T2 of high frequency current If.

For instance, when average recording laser output P3 (cf. FIG. 7) is set at 20 mW, the peak laser output during period T1 of high frequency current If becomes 22 mW, and it becomes 19 mW during period T2 of high frequency current If (i.e., the laser oscillation is not stopped during period T2).

Figure 7:
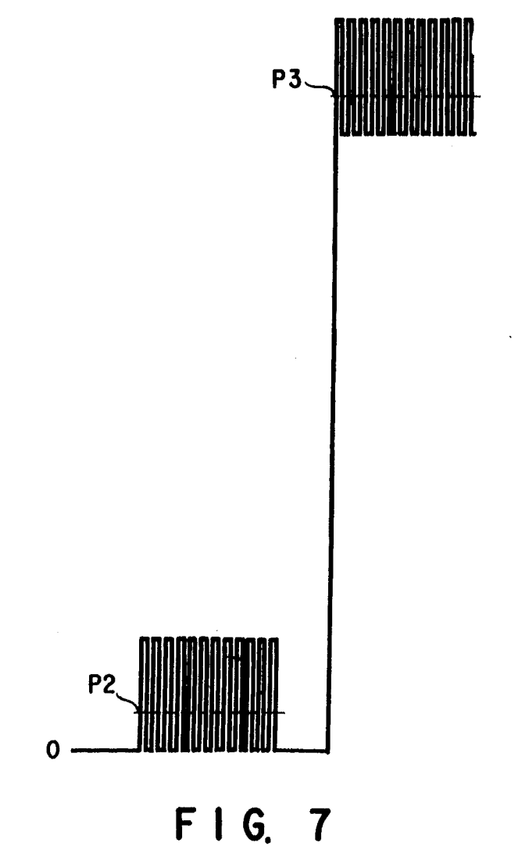
FIG. 7 shows waveforms indicating the average laser output levels (P2, P3) obtained by the high-frequency-current-superimposed drive current.

When the drive current becomes I3 (=I1(PB)), no recording to optical disk 1 is performed. More specifically, because of the presence of superimposed high frequency current If, the average laser output level becomes P2 (about 1 mW) during the reproduction (playback) and non-recording periods, as shown in FIG. 7, while the average laser output level becomes P3 (about 20 mW) during the recording period.

Figure 8A:
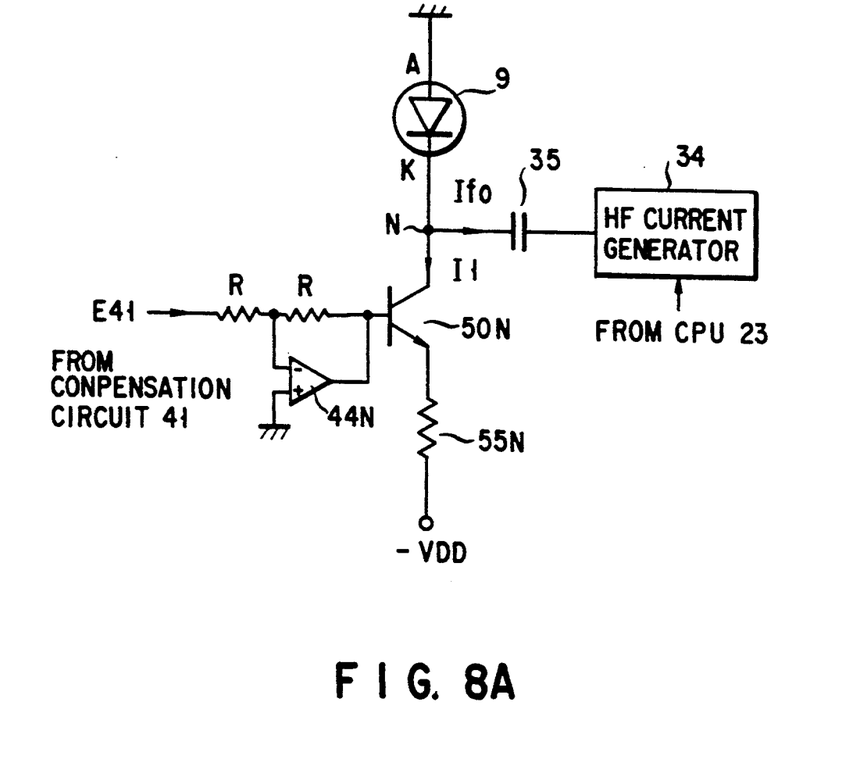
FIG. 8A is another example of the circuit configuration of the drive circuit in FIG. 2, in which the laser diode is used in the anode-common connection.

FIG. 8A is another example of the circuit configuration of drive circuit 40, wherein laser diode 9 is used in the anode-common connection.

More specifically, the anode of laser diode 9 is circuit-grounded, and the cathode thereof is connected to the collector of NPN transistor 50N. The emitter of transistor 50N is connected via resistor 55N to a negative power supply of $-$VDD. The base of transistor 55N receives a signal which is obtained by inverting the analog level of signal E41 from compensation circuit 41. This level inverting is achieved by an analog inverter which comprises operational amplifier 44N and two series resistors R provided in the negative feedback circuit of amplifier 44N.

Figure 8B:
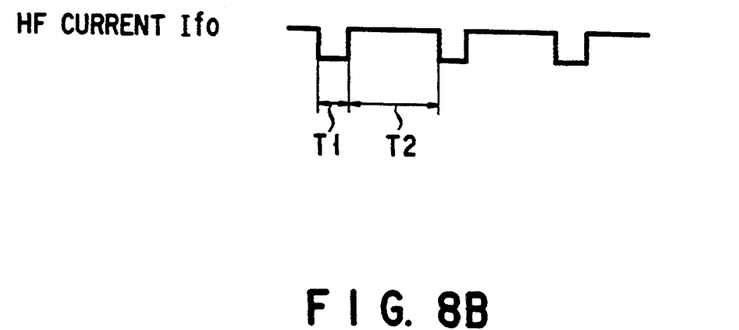
FIG. 8B exemplifies a waveform of the high frequency current used in the circuit of FIG. 8A.

Since the direction of drive current I1 supplied to laser diode 9 in the circuit of FIG. 8A is opposite to that in the circuit of FIG. 3, the direction of high frequency current Ifo in FIG. 8A is also opposite to that in FIG. 3. Thus, high frequency current generator 34 in the circuit of FIG. 8A generates high frequency current Ifo having a waveform as shown in FIG. 8B.

FIG. 9 is an example of the circuit configuration of high frequency current generator 34 in FIG. 1.

In FIG. 9, odd numbers (five) of inverters 341 to 345 are series-connected. Each of these inverters has a signal transmission time (or delay time) of 0.5 ns, for example. Output signal E345 of the series inverters is fed back to the input side thereof, to thereby oscillate with the period of 5 ns (or 200 MHz frequency).

The waveform of signal E345 is rectangular and has a duty ratio of 50%. Signal E345 is level-inverted and time-delayed by 0.5 ns through inverter 346 which then supplies signal E346 to AND gate 347.

AND gate 347 also receives signal E345 from inverter 345 and high frequency current oscillation control signal OCS from CPU 23. When the signal level of OCS is "0", no output is obtained from AND gate 347. When the signal level of OCS is "1", AND gate 347 outputs signal E347 of 200 MHz by which high frequency current If (or Ifo) is produced.

Figure 10:
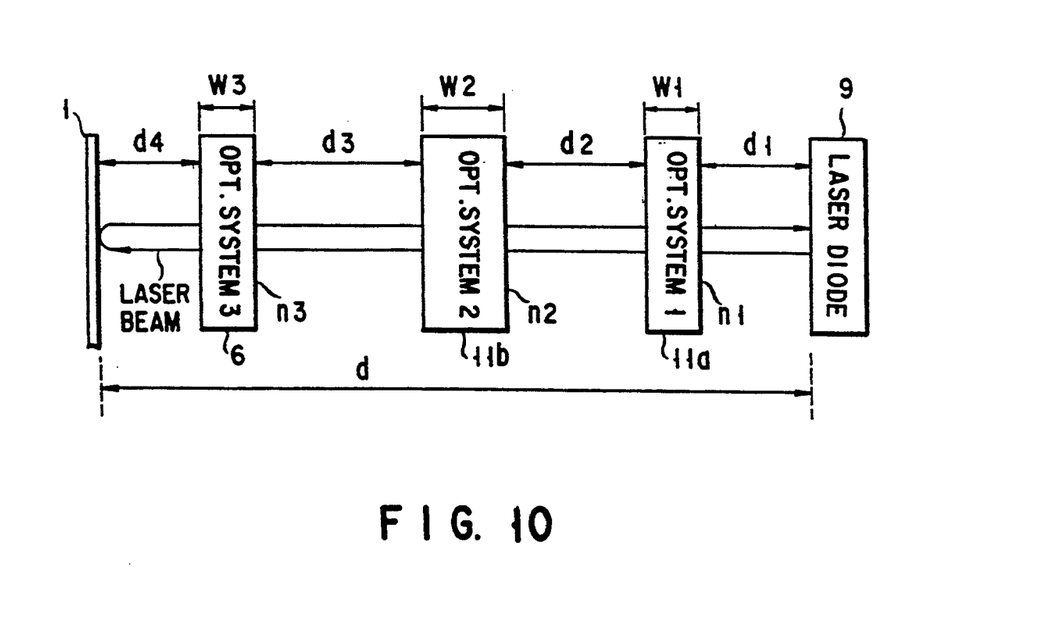
FIG. 10 is another schematic diagram for explaining the laser beam path (d) between the surface of the optical disk and the laser diode.

FIG. 10 is a schematic diagram for explaining the laser beam path (d) between the surface of optical disk 1 and laser diode 9.

In FIG. 10, optical systems 6, 11a, and 11b, respectively have individual and different refractive indexes which are not equal to the refractive index (=1) of air.

In FIG. 10, the optical path of length d between laser diode 9 and optical disk 1 includes optical system 1 (11a) having refractive index n1 and width w1, optical system 2 (11b) having refractive index n2 and width w2, and optical system 3 (6) having refractive index n3 and width w3, where n1$\neq$n2$\neq$n3$\neq$1. The distance between laser diode 9 and optical system 1 is d1, the distance between optical systems 1 and 2 is d2, the distance between optical systems 2 and 3 is d3, and the distance between optical system 3 and optical disk 1 is d2.

In the configuration of FIG. 10, time Tt required to reciprocate the laser light between laser diode 9 and optical disk 1 is:

$$Tt = 2(d1+d2+d3+d4+w1 \cdot n1+w2 \cdot n2+w3 \cdot n3)/c) \quad$$

where the refractive index of the area other than optical systems 1-3 is assumed to be 1, and c denotes the speed of the laser light in the area of refractive index 1.

Within time Tt mentioned above, the laser light emitted from laser diode 9 can travel from diode 9 to disk 1 and return from disk 1 to diode 9.

In order to avoid unstable laser oscillation or generation of noise, it is important that the timing of reaching the laser light returned from disk 1 to diode 9 falls within the longer period (laser oscillation stopping period T2) of the pulse waveform of high frequency current If. From this, the following relation should be maintained:

$$T1(=Ton) < Tt < T2(=Toff) \quad (4)$$

If an approximation of (d1+d2+d3+d4)$\gg$(w1$\cdot$n1+w2$\cdot$n2+w3$\cdot$n3) can be practically applied to relation (3), item Tt in equation becomes 2d/c. In this case, relation (4) becomes equal to aforementioned relation (2).

Figure 11:
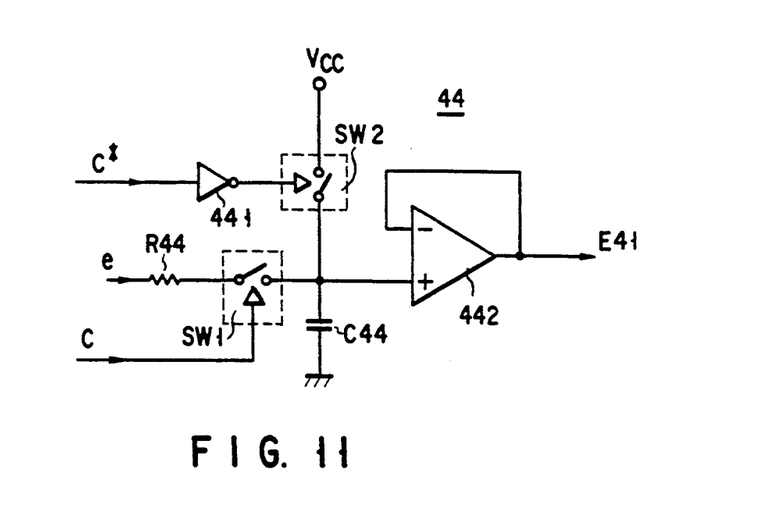
FIG. 11 is an example of the circuit configuration of the sample/hold circuit in FIG. 2.

FIG. 11 is an example of the circuit configuration of sample/hold circuit 44.

CPU 23 controls the on/off of switch 1 by signal c, and controls the on/off of switch 2 by signal c*.

When both signals c and c* has low level "0", switch 1 is opened while switch 2 is closed. In this case, the input potential of buffer amplifier 442 is latched up to the power supply potential Vcc, so that amplifier 442 outputs high level signal E41 by which the magnitude of drive current I1(PB) from transistor 50 in FIG. 3 is determined. In this case, current I1(PB) becomes zero.

When both signals c and c* has high level "1", switch 1 is closed while switch 2 is opened (sample state). In this case, the input of buffer amplifier 442 is free of power supply potential Vcc, and receives the potential charged at capacitor C44. This charged potential is obtained by charging capacitor C44 by error signal e via resistor R44. Amplifier 442 outputs signal. E41 having a potential corresponding to error signal e by which the magnitude of playback drive current I1(PB) is determined.

When signal c* has high level "1" while signal c becomes low level "0", both switches 1 and 2 is opened (hold state). In this case, the input potential of buffer amplifier 442 is the potential charged at capacitor C44. This charged potential is obtained from capacitor C44 immediately before changing the level of signal c at time t20. Thus, the potential of output signal E41 from amplifier 442 is held at the potential for playback drive current I1(PB).

FIGS. 12A–12F show waveforms for explaining the operation of sample/hold circuit 44.

When CPU 23 instructs the laser oscillation, CPU sends signal C* to inverter 441. At time t10 in FIGS. 12A–12F, the logical level of signal C* changes from "0" to "1" in order to start the laser oscillation.

Figure 12A:
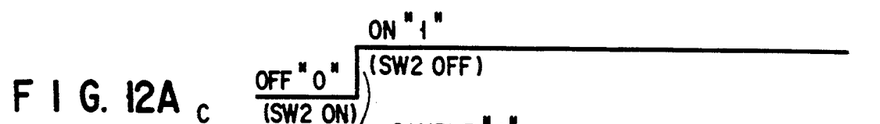
FIGS. 12A–12F show waveforms for explaining the operation of the circuit of FIG. 11.

By the level change of signal C* from "0" to "1", the output level of inverter 441 changes from "1" to "0", so that switch 2 is changed from ON to OFF, as shown in FIG. 12A.

Figures 12B, 12C:
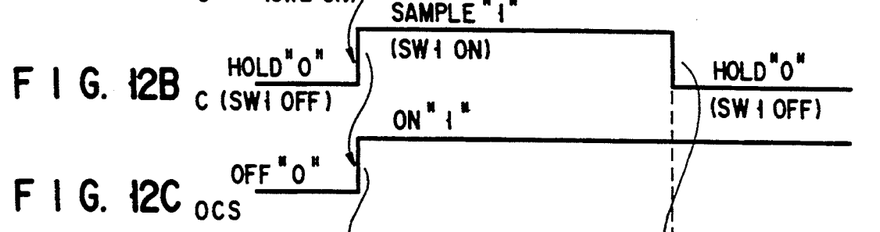

With the level change of signal C*, the logical level of signal C from CPU 23 is also changed from "0" to "1", so that switch 1 is changed from OFF (hold state) to ON (sample state), as shown in FIG. 12B.

In response to the level change of signal C, CPU 23 sends oscillation control signal OCS to AND gate 347 in FIG. 9. When the laser oscillation is to be started, the logical level of signal OCS changes from "0" to "1", as shown in FIG. 12C.

Figures 12D, 12E:
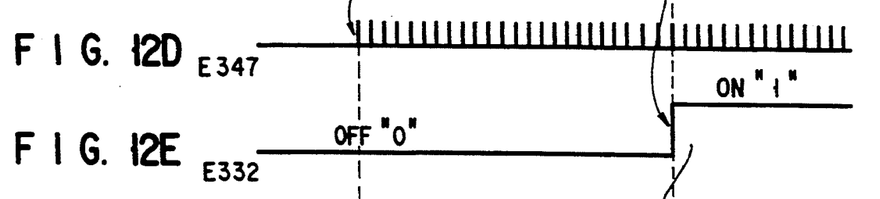

When signal OCS is "1", AND gate 347 in FIG. 9 is opened so that 200 MHz pulse E347 is output from high frequency current generator 34, as shown in FIG. 12D.

When 200 MHz pulse E347 is applied to node N via capacitor 35, high frequency current If flows through capacitor 35 and mixed (or superimposed) to drive current I1 from laser driver 14. The information recorded on optical disk 1 is reproduced (or played back) using this drive current I1 to which high frequency current If is superimposed (from time t10 to t20 in FIGS. 12A–12F Under the condition of continuing the laser oscillation, in response to the level change of signal c from "1" (sample state) to "0" (hold state) as shown FIG. 12B, the logical level of record data signal E332 changes from "0" to "1", as shown at time t20 in FIG. 12E.

When signal E332="1", transistor 52 is turned while transistor 51 is turned on, so that the collector current of transistor 53 flows through transistor 51 to laser diode 9.

Figure 12F:
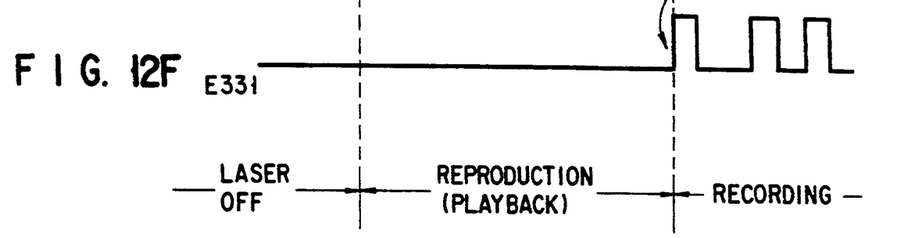

Signal E331 has high/low levels representing the data to be recorded, as shown in FIG. 12F. Under the condition of signal E332="1", when signal E331 is applied to the base of transistor 53, the collector current is modulated by the level change of signal E331, and the modulated current is supplied as drive current I1 to laser diode 9. After time t20, the information signal E331 is recorded to optical disk 1, using drive current I1 with superimposed high frequency current If.

As has been mentioned above, according to the embodiment of the present invention, the laser oscillation in an information playback mode is always stopped when the laser light is returned from optical disk 1 to laser diode 9, thereby completely eliminating the influence of the returned laser light. Since the peak output power (P1 in FIG. 4C) during the laser oscillation period (T1) is far larger than that (P2) during the laser stopping period (T2), laser diode 9 can continue its laser oscillation stably.

In summary, according to the present invention, it is possible to obtain an optical information reproducing apparatus in which a highly stable and low noise laser oscillation can be performed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproducing apparatus for reproducing information which is recorded at a recording frequency on a recording medium, the apparatus comprising:

a laser diode for irradiating a light beam onto the recording medium;

means for generating a high frequency signal of a pulse waveform, the pulse waveform having a first period T1 to energize said laser diode and a second period T2 to deenergize said laser diode, the high frequency signal having a frequency higher than the recording frequency, the first period T1 satisfying the following equation:

$$T1 < 2d/c, \ T1 < T2$$

where, d: a distance between said laser diode and the recording medium;

c: a velocity of the light beam;

means for driving said laser diode in accordance with the high frequency signal; and means for reproducing the information recorded on the recording medium by detecting the light beam from the recording medium in synchronism with said recording frequency.

2. A laser diode driving apparatus for irradiating a light beam onto a medium, the apparatus comprising:

a laser diode for irradiating a light beam onto the recording medium;

a driving signal generator for generating a driving signal having a first period T1 to energize said laser diode and a second period T2 to deenergize said laser diode, the first period T1 satisfying the following equation:

$$T1 < 2d/c, \quad T1 < T2$$

where,
- d: a distance between said laser diode and the recording medium;
- c: a velocity of the light beam;

means for driving said laser diode in accordance with the driving signal.

3. An information reproducing apparatus comprising:
drive current generator means for generating a drive current;
high frequency current generator means for generating a high frequency current having a pulse waveform, the pulse wave form having a first and a second period;
means for superimposing the high frequency current generated by the high frequency current generator means and the drive current generated by the drive current generator means so as to provide a superimposed drive current;
laser oscillator means for generating a laser light, used for reproducing information from an information recording medium, based on the superimposed drive current provided by the superimposing means;
optical means for leading the laser light generated by the laser oscillator means to the information recording medium;
means for monitoring the laser light generated by the laser oscillator means to provide a monitor signal; and
means for controlling the drive current generated by the drive current generator means so as to set the laser light generated by the laser oscillator means to a predetermined intensity; and
wherein the first period satisfies the equation:
$T1 < 2d/c$ and $T1 < T2$, where:
  T1 denotes the first period;
  T2 denotes the second period;
  d is a distance between the laser oscillator means and the information recording medium; and
  c is the velocity of the laser along a path from the laser oscillator means to the information recording medium.

4. The information reproducing apparatus of claim 3, wherein the high frequency current generator means includes an oscillator circuit for generating a pulse signal which is used for generating the high frequency current.

5. The information reproducing apparatus of claim 4, wherein the high frequency current generator means further includes means for producing, from the pulse signal, the high frequency current, wherein the first period is used by the laser oscillator means for generating the laser light and the second period is used for stopping the generation of the laser light, the second period being longer than the first period.

6. The information reproducing apparatus of claim 5, further comprising:
means for setting the second period so that the generation of the laser light is stopped when the laser light, which has been generated during the first period, is reflected from the information recording medium and returned to the laser oscillator means.

7. An apparatus for optically recording or reproducing information to or from an information recording medium, the apparatus comprising:
drive current generating means for generating drive current;
high frequency current generating means for generating a high frequency current having a first level for a first period of time and a second level for a second period of time, which is longer than the first period of time;
laser means, responsive to the drive current and the high frequency current, for performing a laser oscillation during the first period of time so as to provide a laser light;
means for guiding the laser light from the laser means to the information recording medium; and
means for arranging a relative location of the laser means and the information recording medium so as to substantially match a first timing, at which the laser means receives the high frequency current of the second period of time, to a second timing, at which the laser light reflected at the information recording medium returns to the laser means; and
wherein the drive current generating means includes:
  means for monitoring the laser light provided by the laser means and for outputting a monitor signal;
  means for comparing the monitor signal with a predetermined reference signal and for generating an error signal representing a difference between the monitor signal and the predetermined reference signal; and
  means for controlling the drive current so as to decrease the error signal; and
wherein the first period satisfies the equation:
$T1 < 2d/c$, where:
  T1 denotes the first period;
  d is a distance between the laser oscillator means and the information recording medium; and
  c is the velocity of the laser light along a path from the laser oscillator means to the information recording medium.

8. The apparatus of claim 7, wherein the drive current generating means further includes:
means for changing the drive current so as to determine an intensity of the laser light; and
means for modulating the drive current changed by the changing means so as to supply a modulated drive current to the laser means.

9. An information reproducing apparatus comprising:
drive current generator means for generating a drive current;
high frequency current generator means for generating a high frequency current having a pulse waveform, the high frequency current generator means including:
  an oscillator circuit for generating a pulse signal which is used for generating the high frequency current; and
  means for producing, from the pulse signal, the high frequency current, the high frequency current having a first and a second period, the first period being used by the laser oscillator means for generating the laser light and the second period being used by the laser oscillator means for stopping the generation of the laser light, the second period being longer than the first period;

means for superimposing the high frequency current generated by the high frequency current generator means and the drive current generated by the drive current generator means so as to provide a superimposed drive current;

laser oscillator means for generating a laser light, used for reproducing information from an information recording medium, based on the superimposed drive current provided by the superimposing means;

optical means for leading the laser light generated by the laser oscillator means to the information recording medium, the optical means including means for setting a condition so that $T1 < 2d/c < T2$, where:

T1 denotes the first period;

T2 denotes the second period;

d is a distance between the laser oscillator means and the information recording medium; and c is the velocity of the laser light along a path from the laser oscillator means to the information recording medium;

means for monitoring the laser light generated by the laser oscillator means to provide a monitor signal; and means for controlling the drive current generated by the drive current generator means so as to set the laser light generated by the laser oscillator means to a predetermined intensity.

10. The information reproducing apparatus of claim 9, wherein the high frequency current generator means includes an oscillator circuit for generating a pulse signal, which is used for generating the high frequency current.

11. The information reproducing apparatus of claim 10, wherein the high frequency current generator means further includes means for producing, from the pulse signal, the high frequency current, wherein the first period is used by the laser oscillator means for generating the laser light and the second period is used for stopping the generation of the laser light, the second period being longer than the first period.

12. The information reproducing apparatus of claim 11, further comprising:

means for setting the second period so that the generation of the laser light is stopped when the laser light, which has been generated during the first period, is reflected from the information recording medium and returned to the laser oscillator means.

* * * * *